March 10, 1925.

R. MacEACHEN

PETTICOAT INSULATOR

Filed April 28, 1923

1,529,262

Roderick MacEachen,
Inventor

By Lester L. Sargent
Attorney

Patented Mar. 10, 1925.

1,529,262

UNITED STATES PATENT OFFICE.

RODERICK MacEACHEN, OF WASHINGTON, DISTRICT OF COLUMBIA.

PETTICOAT INSULATOR.

Application filed April 28, 1923. Serial No. 635,207.

*To all whom it may concern:*

Be it known that I, RODERICK MAC-EACHEN, a citizen of the United States, residing at Washington, D. C., have invented a new and useful Petticoat Insulator, of which the following is a specification.

The object of my invention is to provide a novel petticoat insulator for use on the lid of a storage battery case used as a part of the equipment of a miner's electric portable or safety lamp, the prime object of this novel petticoat insulator being to prevent the occurrence of a short-circuit. I attain the objects of my invention by the device illustrated in the accompanying drawings, in which—

Like numerals indicate like parts in each of the several views.

Figure 1:
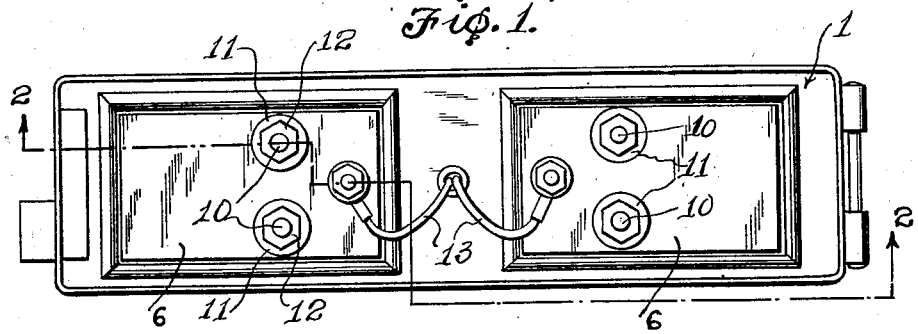
Figure 1 is a top plan of the invention applied to the under side of the lid or cover of the storage battery case of a miner's electric portable safety lamp.
Figure 2:
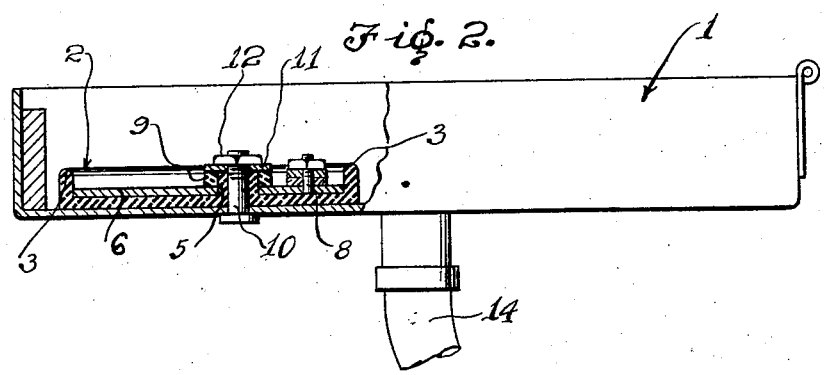
Fig. 2 is a detail longitudinal section on line 2—2 of Fig. 1.
Figure 3:
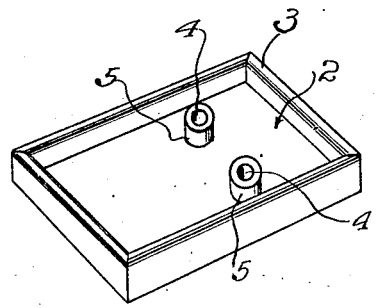
Fig. 3 is a perspective view of the insulator box.
Figure 4:
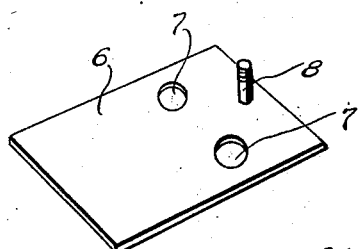
Fig. 4 is a detail perspective view of metal plate 6.
Figure 5:
Fig. 5 is a detail perspective view of the washer 9 which it is now possible to substitute in place of the flange washer formerly required.

Referring to the accompanying drawings, I provide a novel petticoat insulator 2 of non-conducting material having the novel upstanding sides or petticoat 3. This box is also provided with the upstanding tubes 5 having passages 4 therethrough of suitable size for the insertion of the bolts 10, as shown in Fig. 2. I provide metal plates 6 of suitable size to seat in the insulator box 2, said plates having apertures 7 of suitable size to seat over the upstanding tubes 5, as shown in Fig. 2. Affixed to the end of insulator plate 6 I provide a stud 8 to which the lead or current conductor 13 is suitably secured. I provide a plain insulation washer 9 seating around the tube 5 as shown in Fig. 2. The tubes 5 on the insulator box effect a substantial reduction in the expense of manufacturing the device, inasmuch as it is possible to use the plain washers 9 in place of the much more expensive flanged washers heretofore required. I provide the usual copper washer 11 on insulator washer 9 and the usual nut 12 for securing bolt 10 in place, as shown in Fig. 2. Two of the insulator boxes 2 are provided, arranged in the conventional way, in the lid or cover 1 of the storage battery case of a portable miner's electric safety lamp. A flexible cable 14 carrying the leads 13 extends to the lamp, which is not illustrated.

The sides 3 and the tubes 5 of insulator box 2 provide an efficient means of protecting the metal plates 6 against the possibility of a short-circuit occurring if any water gets under the lid 1 of the battery case.

The device is used in the same manner as the conventional insulator plate which it has replaced, but it obviates the danger of short-circuiting which has heretofore been a disadvantage of these devices, and it also effects a substantial saving in the cost of manufacture of the equipment, inasmuch as it eliminates the especially made annular flanged washers which have heretofore been required at the point now occupied by the upstanding tubes 5 of the petticoat insulator 2.

What I claim is:

1. A petticoat insulator for use on the lid of a storage battery case on a miner's electric safety lamp, said insulator being of a non-conductive material and having a petticoat portion of the same material adapted to prevent short-circuiting.

2. A device of the class described comprising a petticoat insulator for use on the lid of a storage battery case on a miner's electric safety lamp, said insulator being of non-conductive material, and having upstanding sides, and having upstanding spaced tubes to receive the bolts which secure the device to the battery case lid, the aforesaid sides and tubes being of non-conducting material.

3. In a device of the class described, the combination of an insulator box having upstanding sides and upstanding tubes, all of insulation material, a metal plate having orifices positioned to seat over the tubes, the plate also having an upstanding stud for attachment to the usual lead, and means for securing the insulator box on the conventional storage battery case lid, said means engaging over the top of the upstanding tubes and the plain washers encircling said tubes, substantially as described.

RODERICK MacEACHEN.